US009256299B2

(12) United States Patent
Suggs

(10) Patent No.: US 9,256,299 B2
(45) Date of Patent: Feb. 9, 2016

(54) CLIENT DEVICE ORIENTATION

(75) Inventor: Bradley Neal Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 392 days.

(21) Appl. No.: 13/596,557

(22) Filed: Aug. 28, 2012

(65) Prior Publication Data

US 2014/0062874 A1 Mar. 6, 2014

(51) Int. Cl.
 G06F 3/033 (2013.01)
 G06F 3/03 (2006.01)
 G06F 3/0481 (2013.01)
 G06F 3/0346 (2013.01)

(52) U.S. Cl.
 CPC ............ G06F 3/0325 (2013.01); G06F 3/0346 (2013.01); G06F 3/0481 (2013.01)

(58) Field of Classification Search
 CPC .... G06F 3/0325; G06F 3/0481; G06F 3/0346
 USPC .......................................... 345/158; 382/103
 See application file for complete search history.

(56) References Cited

U.S. PATENT DOCUMENTS

| | | | |
|---|---|---|---|
| 6,710,754 B2 * | 3/2004 | Hanson et al. ................. 345/2.1 |
| 8,447,070 B1 * | 5/2013 | Bozarth et al. ................ 382/103 |
| 8,451,344 B1 * | 5/2013 | Karakotsios ............... 348/222.1 |
| 8,634,848 B1 * | 1/2014 | Bozarth et al. ............. 455/456.1 |
| 8,686,921 B2 * | 4/2014 | Lyons et al. .................... 345/1.1 |
| 2005/0140696 A1 * | 6/2005 | Buxton ............... G06F 3/04845 345/660 |
| 2005/0168399 A1 * | 8/2005 | Palmquist ............. G06F 1/1601 345/1.1 |
| 2006/0156249 A1 * | 7/2006 | Blythe .................. G06F 3/0481 715/781 |
| 2008/0194323 A1 | 8/2008 | Merkli et al. |
| 2009/0031258 A1 | 1/2009 | Arrasvuori et al. |
| 2009/0221298 A1 * | 9/2009 | Hanner ...................... 455/456.1 |
| 2010/0113148 A1 * | 5/2010 | Haltovsky ............... A63F 13/12 463/30 |
| 2010/0285881 A1 * | 11/2010 | Bilow ....................... A63F 9/24 463/37 |
| 2011/0081860 A1 * | 4/2011 | Brown et al. ................ 455/41.3 |
| 2011/0165923 A1 * | 7/2011 | Davis ........................ A63F 9/24 463/1 |
| 2011/0319148 A1 | 12/2011 | Kinnebrew et al. |
| 2012/0095822 A1 | 4/2012 | Chiocchi |
| 2012/0330600 A1 * | 12/2012 | Kuo et al. ..................... 702/150 |
| 2013/0083074 A1 * | 4/2013 | Nurmi ................... G06F 3/0488 345/650 |
| 2013/0150136 A1 * | 6/2013 | Davis ........................ A63F 9/24 463/1 |
| 2013/0262687 A1 * | 10/2013 | Avery et al. .................... 709/229 |
| 2014/0013100 A1 * | 1/2014 | Menzel et al. ................ 713/150 |

OTHER PUBLICATIONS

Ofori, M., Multi-media Advertising—What is a QR Code: Use It to Maximize Your Sales!, (Research Paper), Jan. 30, 2011.

* cited by examiner

*Primary Examiner* — Rodney Amadiz
(74) *Attorney, Agent, or Firm* — Hewlett-Packard Patent Department

(57) ABSTRACT

Systems and methods are provided for determining an orientation of one or more client devices relative to a computing device. In various embodiments a method and system is provided for receiving, via a client device, data being displayed on a computing device. The data is used to determine an orientation of the client device relative to a computing device. The determined orientation of the client device is used to orient a user interface of a computing device.

20 Claims, 7 Drawing Sheets

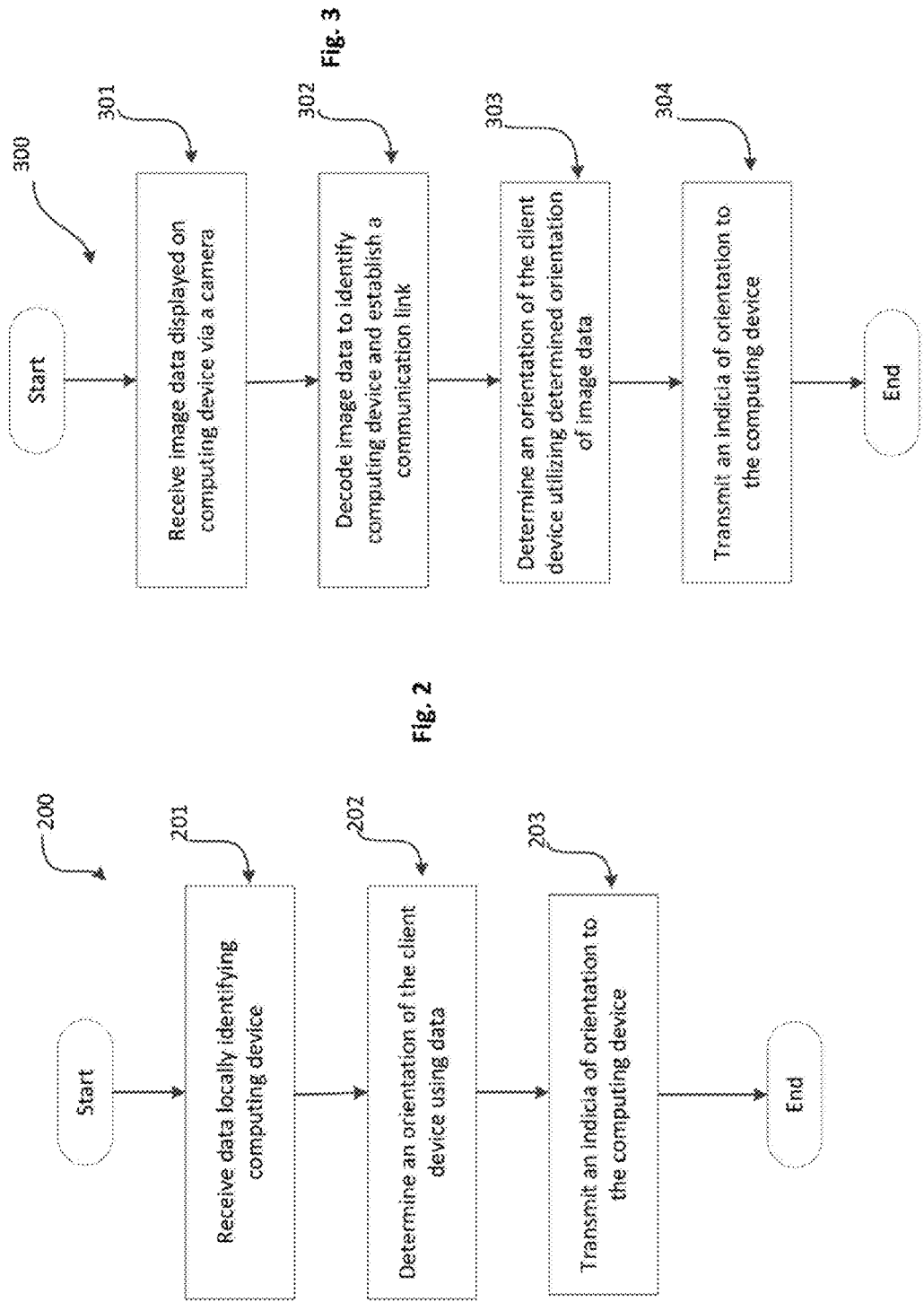

CLIENT DEVICE ORIENTATION

BACKGROUND OF THE INVENTION

Computing devices may communicate with other devices for multiple reasons. The communication may occur via Local Area Networks (LANs) using various protocols, for example Wi-Fi. Data may be exchanged on these networks for various reasons and in some examples may enable multiple devices to participate in an event, for example a game.

BRIEF DESCRIPTION OF THE DRAWINGS

FIG. 2 is a flow chart in accordance with an example of the present disclosure.

FIG. 3 is a flow chart in accordance with an example of the present disclosure.

DETAILED DESCRIPTION

Figure 1A:
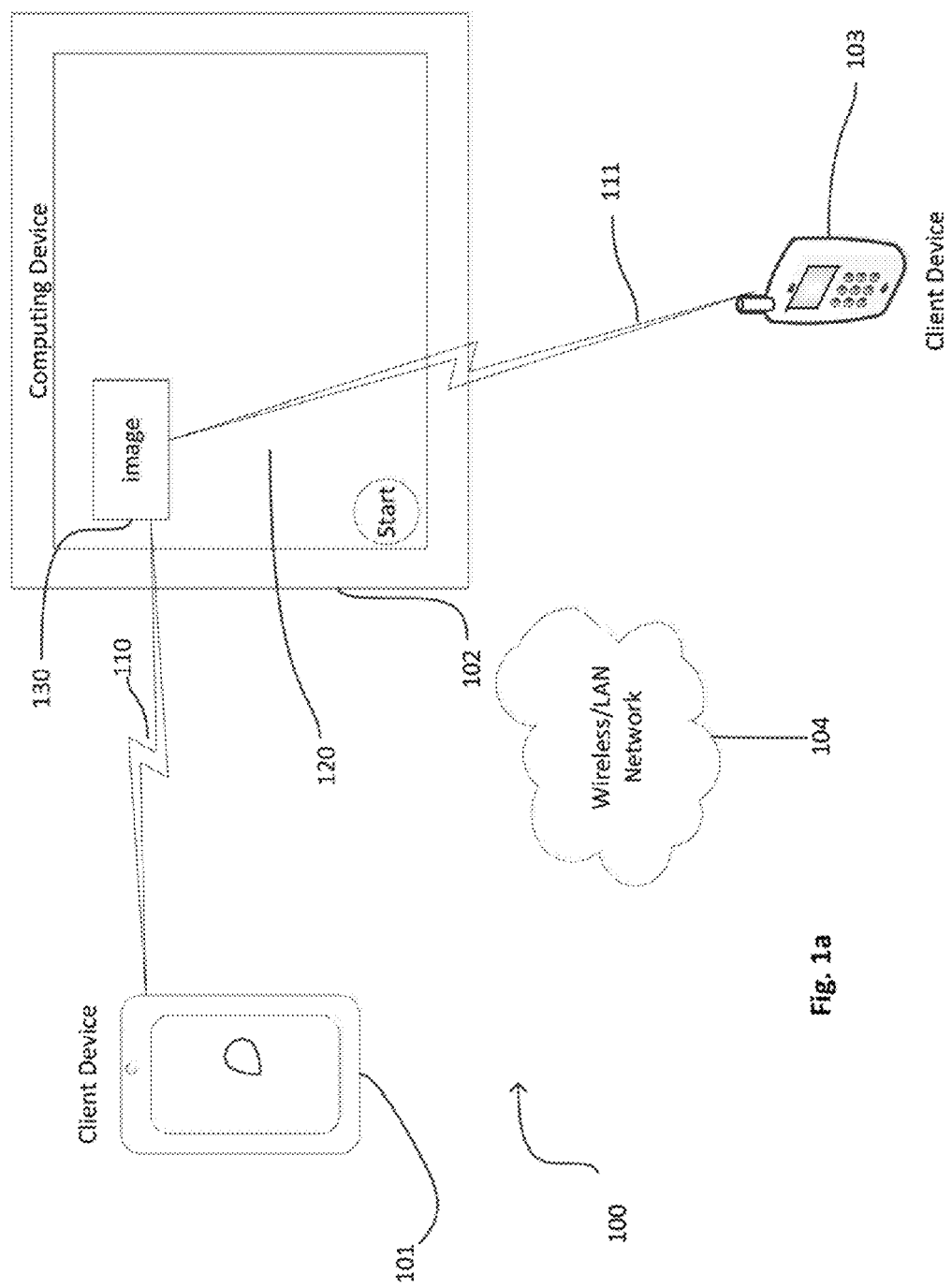
FIG. 1A is a block diagram of client and computing devices according to an example of the present disclosure.

Local Area Networks (LANs) using various protocols, near field communication (NFC) standards, and other forms for communication generally fail to capture spatial relationships between computing devices. Solutions involving ultrasound techniques for understanding spatial relationships between objects are uncommon. Further, the use of ultrasound in mobile consumer devices and computing devices is costly and unlikely. Affording the enhanced feature of capturing the spatial relationship of client devices to improve a user experience would be advantageous.

It would be useful to obtain information regarding the orientation or spatial relationship of participants joining an activity such as a virtual board game or a virtual card game or even a side-by-side interacting experience. For example, card and board games include activities that may utilize both mobile devices and a stationary display. These activities may benefit from both private screens and a shared screen. Knowing the orientation of the mobile devices with respect to the stationary screen allows the user interface of the stationary screen to indicate the proper virtual placement of the participants in such an activity as well as to alter the shared screen based upon the active participant in turn based operations. This information can be gained substantially simultaneously with the joining of an activity through the communication of data like a quick response (QR) code, barcode, aura, watermark, or other image that has an orientation.

When using mobile devices around a stationary screen for a collaborative activity, such as a virtual card game or virtual board game where the mobile devices are utilized as private screens and the computing device is utilized as a shared screen, it is desirable to know how the mobile devices are positioned with respect to the stationary screen. Information may be used to represent the location of participants in a virtual board game and orient the main virtual board toward the participant whose turn is currently underway. Visual observation from the mobile devices can provide that information by knowing what is displayed on the computing device screen and using the mobile device orientation sensors along with its camera to determine the mobile placement with respect to the shared screen.

For example, a QR code could be used to establish a linkage between a mobile device and a computing device. The QR code could be read upside down by a mobile device, for example, and information that the QR code was read upside down could be passed back from the mobile device to the computing device to allow the computing device to understand that the particular mobile device was located to the top of the computing device (assuming that the computing device's display was flat on a table). In this way, linkage between the mobile device and computing device could be simultaneously affected as well as the information regarding orientation communicated to the computing device. Accomplishing both the linking and orienting with the same process simplifies the user experience. In addition to using computing device sensors to know its orientation, using a mobile device's sensors, for example a camera, while aimed at the computing device's display allows information regarding the client device's orientation to be gained.

In various embodiments, methods, systems, and configurations for capturing spatial relationships of client devices, such as mobile devices, are provided. FIGS. 1A-D schematically illustrate a computing system 100 according to an embodiment of the present disclosure. Client devices 101 and 103 may be any of several mobile devices such as tablets, smartphones, netbooks, and/or notebooks. Computing device 102 may be a personal computer (computing device), television, tablet, or laptop, and includes a user interface 120. In an embodiment of the present disclosure, client and computing devices are in close proximity to each other and may be connected over a wireless network or LAN 104 for sharing resources such games, files, and other applications or services. The network 104 may be configured using various protocols such as Wi-Fi or pairing techniques.

In FIG. 1A, user interface 120 of computing device 102 displays a visual code 130 that may be sensed (110, 111) by one or more mobile devices (101, 103) and used to determine an orientation of the one or more mobile devices relative to a shared computing device or computing device 102. In one example of the present disclosure, visual code 130 is a quick response (QR) code, barcode, aura, watermark, character, symbol, or other image having an orientation. In addition to being utilized for determining an orientation of mobile devices, visual code 130 may be utilized for pairing client and computing devices. Information for pairing the devices may be encoded in the visual code 130 that is displayed by a computing device 102 and capable of being sensed (110, 111) by any of several mobile devices (101, 103). Alternatively, a client device having a user interface is capable of generating and displaying a visual code, such as needed when a mobile device does not have a means of sensing the visual code from a computing device. In this way, a visual code may be sensed by either a client device or computing device.

The visual code 130 may be dynamically generated, including time-sensitive information such as Dynamic Host Configuration Protocol (DHCP) assigned network address and/or a connection password having an expiration date. The visual code 130 may be encoded with a key to identify a specific computing device or other computing device. In addition to including information that is used to identify a device, the visual code may include information that enables communication over a network, such as a network address (Internet Protocol (IP) address) network port, security credentials (password, cryptographic, keys, security certificates), and so on. The visual code 130 may also include a pointer and/or shortcut to additional information such as a website address that may be used to access additional information associated with the visual code. The visual code 130 may encode additional information, such as executable instructions and/or software modules to instruct a device to configure itself for pairing. The visual code 130 may be generated, encoded, and decoded based on functionality provided by JavaScript and/or ZXing (zebra crossing) libraries for visual code generating, encoding, and decoding, for example.

Figure 1B:
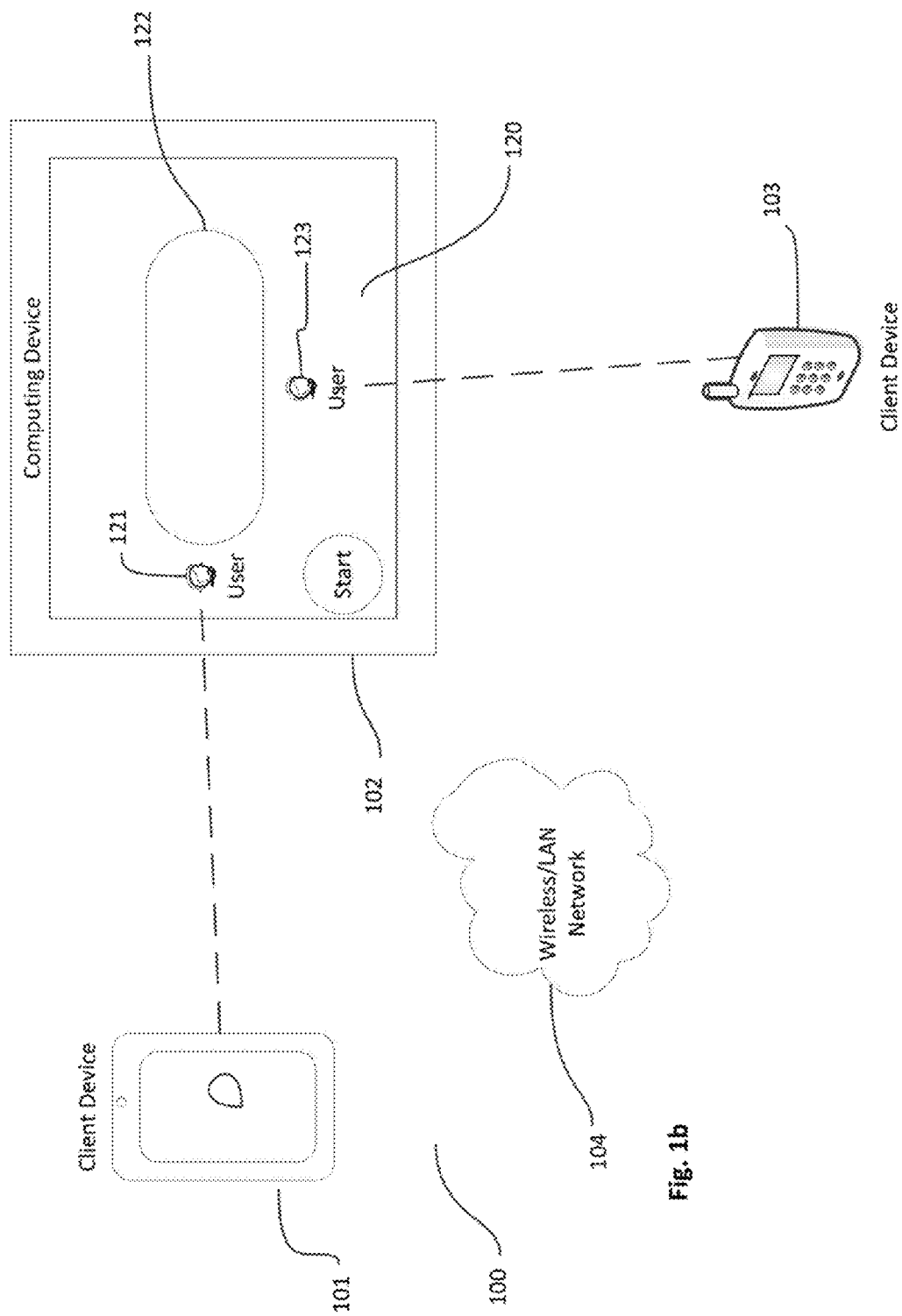
FIG. 1B is a block diagram of client and computing devices according to an example of the present disclosure.
Figure 1C:
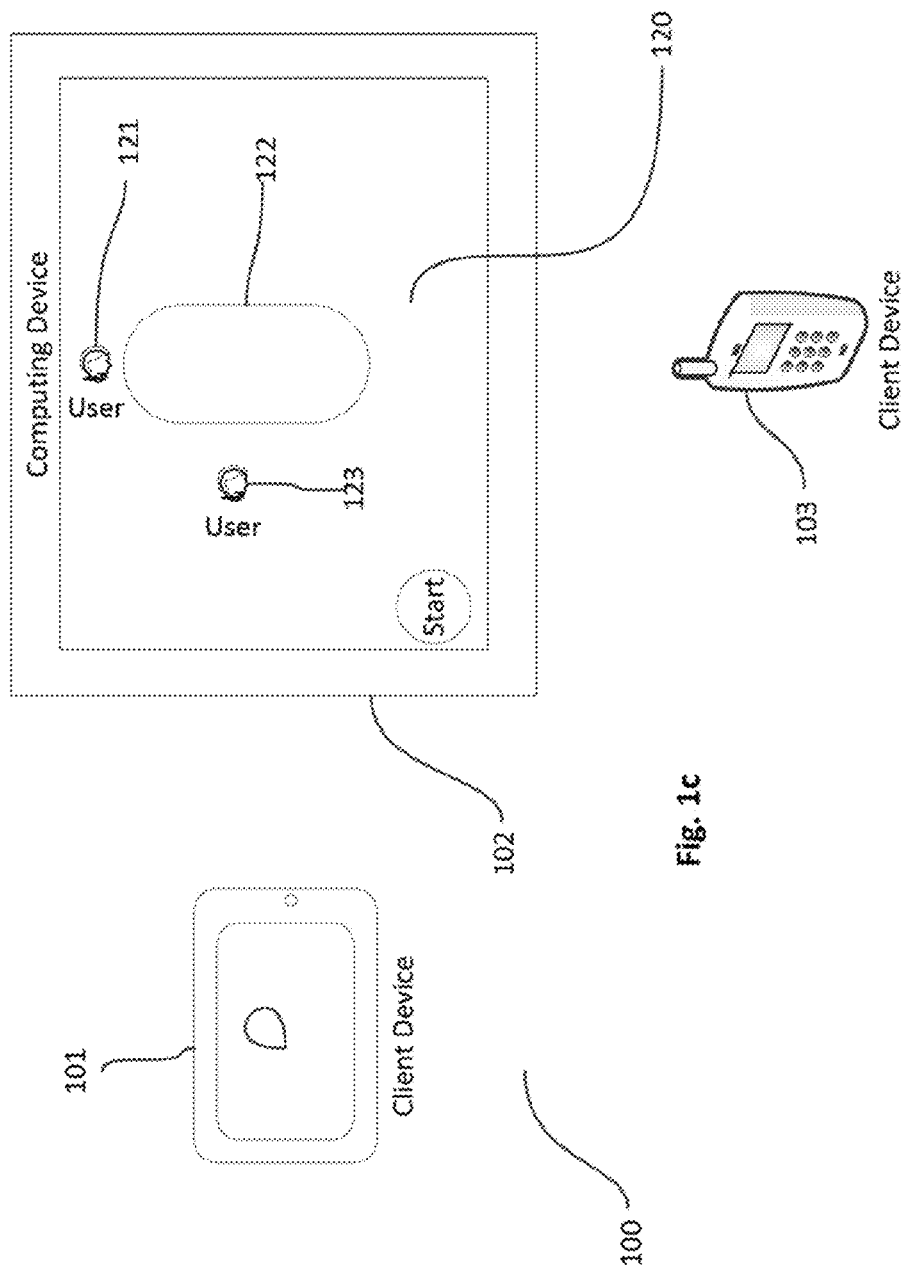
FIG. 1C is a block diagram of client and computing devices according to an example of the present disclosure.
Figure 1D:
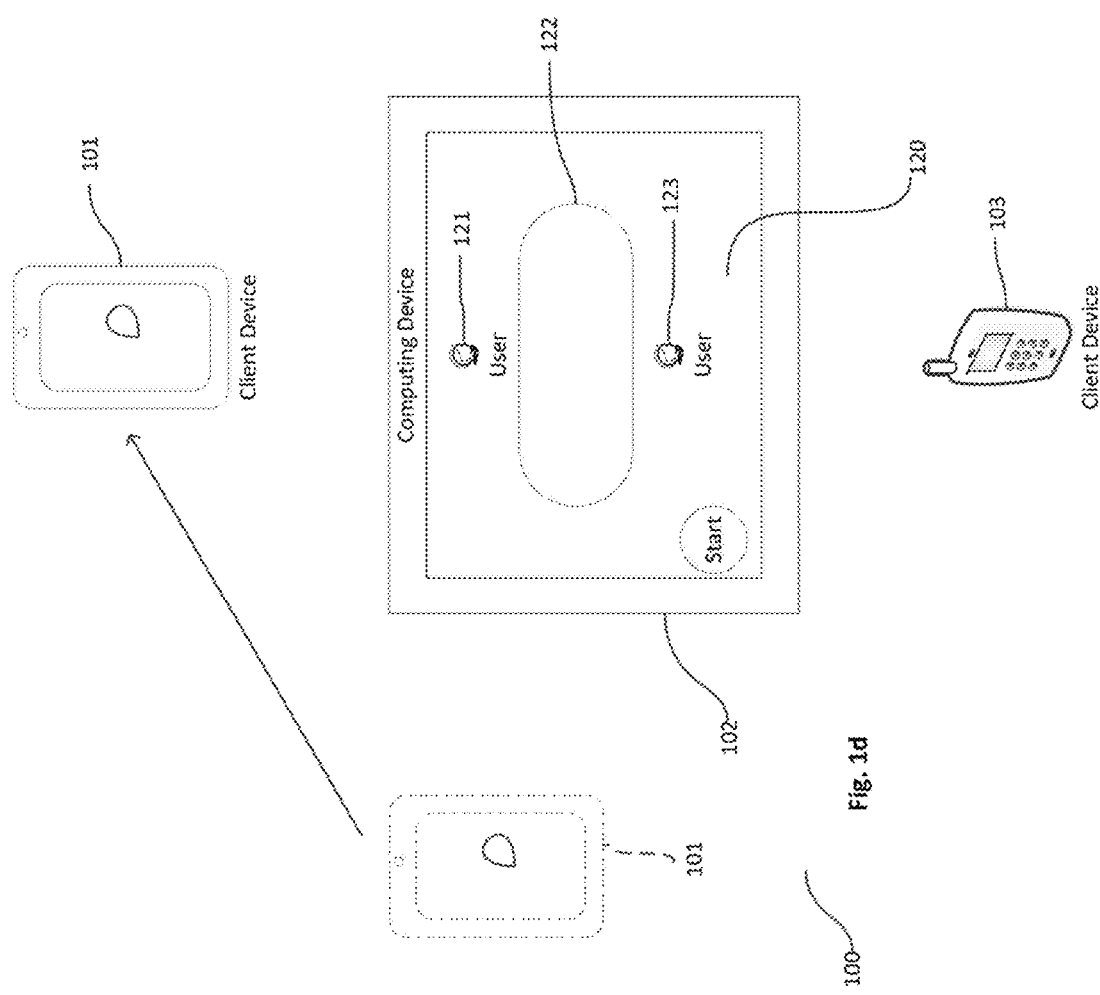
FIG. 1D is a block diagram of client and computing devices according to an example of the present disclosure.

FIGS. 1B-1D illustrate various arrangements of user interface 120, having displayed user interface elements 121, 122, and 123, according to various determined orientations of client devices 101 and 103 with respect to computing device 102. User interface elements 121 and 123 may include icons, avatars, objects, or list items that represent users of client devices 101 and 103, respectively. User interface element 122 may include an icon, object, avatar, or list item that represents shared computing device 102. As an example, in FIG. 1B, user interface 120 displays user interface elements 121 and 123 according to an initial position of client devices 101 and 103, respectively. For example, user interface element 122 in a virtual game may represent computing device 102, where user interface element 122 is displayed as a virtual table in a virtual card game with avatars 121 and 123 representing card players utilizing client devices 101 and 103, respectively. In this example, avatars 121 and 123 are positioned in the virtual game around virtual card game table 122 similar to the placement of players or users of client devices 101 and 103 as positioned around computing device 102. Users of client device 101 and 103 may lay computing device 102 flat on the ground or on another surface to mimic a card game table, or computing device 102 may be placed in an upright position or at an incline.

In FIG. 1C, an arrangement of user interface 120 is displayed according to a second position of client devices 101 and 103. In this example, client device 101 has transmitted an indicia of orientation to computing device 102, e.g. indicating that client device 101 has rotated. An indicia of orientation as used herein is data that indicates an orientation of the transmitting device. In an alternate embodiment, client device 101 has transmitted, to computing device 102, a signal to rotate user interface 120 from an initial position. Similarly, in FIG. 1D, an arrangement of user interface 120 is displayed according to a second position of client devices 101 and 103. In this example, client device 101 has transmitted an indicia of orientation to computing device 102, e.g. indicating that client device 101 has moved to a different position with respect to computing device 102. In this example client device 101 has transmitted an indicia of orientation to computing device 102 causing computing device 102 to relocate avatar 121 from position 1 as in FIG. 1B to position 2 as in FIG. 1D. In various examples, client deices 101, 103 may continually monitor their position and continually update the computing device 102.

Referring to FIGS. 2 and 3, flow diagrams are illustrated in accordance with various embodiments. The flow diagrams may illustrate embodiments of a method associated with the various systems and apparatuses discussed with reference to FIGS. 1A-D and 3-6. While illustrated a sequence of operations, the flow diagrams should not be construed to require that all operations are required for all embodiments, or that the operations must be performed in the same order as described. Additionally, one or more of the operations may be embodied in the form of computer readable instructions stored on a computer readable medium.

The method 200 may begin where, in at least one embodiment, data is generated and displayed on a computing device. The data may be dynamically generated at the request of either a client or computing device. The data may be encoded with a unique key that locally identifies the computing device. The data may comprise any of a quick response (QR) code, barcode, aura, watermark, or other image capable of having an orientation when displayed on a computing device.

At step 201, a client device receives data locally identifying, a computing device. The data may be displayed on the computing device screen and received via a sensor of the client device. Receiving the data may comprise using a camera of the client device to capture the data. Receiving the data may also comprise receiving data that enables communication over a network. The data received at the client device may be decoded to identify the computing device and establish a communication link between the computing device and the client device.

At step 202, client device determines an orientation of the client device relative to the computing device using the received data. In various embodiments, determining an orientation of the client device relative to the computing device comprises determining an orientation of the data received. The data may include a quick response (QR) code, barcode, aura, watermark, or other image having an orientation and displayed on a computing device user interface.

At step 203, based on a determined orientation of the client device, client device transmits an indicia of orientation to the computing device to enable the computing device to orient a user interface for the client device user. For example, the indicia of orientation may include data detailing an avatar mapping of a client device user in relation to a computing device. In various embodiments, the client device transmits the indicia of orientation to allow the computing device to rotate its user interface to represent the virtual placement of the client device with respect to the computing device. The transmitted indicia of orientation enables the computing device to position a user interface element, such as an avatar representing a player of a game session, on the computing device screen. The client device may transmit the indicia in response to any of several events such as a timer, a detected motion of the client device, or a gaming session event such as in a card game when one player's turn ends and another player's turn begins. The transmitted indicia of orientation may also enable the computing device to rotate the user interface from 0 to 360 degrees.

Referring to FIG. 3, the method 300 may begin where, in at least one embodiment of the present disclosure, at step 301, a client device may receive image data displayed on a computing device via a camera. In other embodiments, client device may not comprise a camera; therefore, the image data may be exchanged between devices over an established network connection. At 302, the image data received is then decoded in order to identify the computing device and establish a unique pairing of the devices or communication link.

At 303, orientation of the client device is determined based on a determined orientation of the image data. For example, if a camera of smartphone takes an upside down snapshot of a QR code displayed on a computing device that is positioned flat on a table, then the client device may determine that if the QR code was read upside down from the smartphone, then the smartphone must be located above the computing device. Optionally, the client device may pass the image data back to the computing device in order to allow the computing device to determine the orientation of the client device relative to the computing device based on the determined orientation of the image data.

Finally, at 304, an indicia of orientation is transmitted to the computing device. The transmitted indicia of orientation enables the computing device to arrange the user interface of the computing, device. In various embodiments of the present disclosure, arranging the user interface of the computing device may involve rotating the user interface or arranging an avatar, icon, or list item on the computing device screen to represent the orientation of the one or more client devices relative to the computing device. In various examples, transmitting the indicia of orientation to the computing device may include continually updating the computing device with an orientation of the client device as the client device moves positions or alters its orientation. The continual updating may occur at predefined times, in response to various triggers, based upon turn based operations, or other events.

Figure 4:
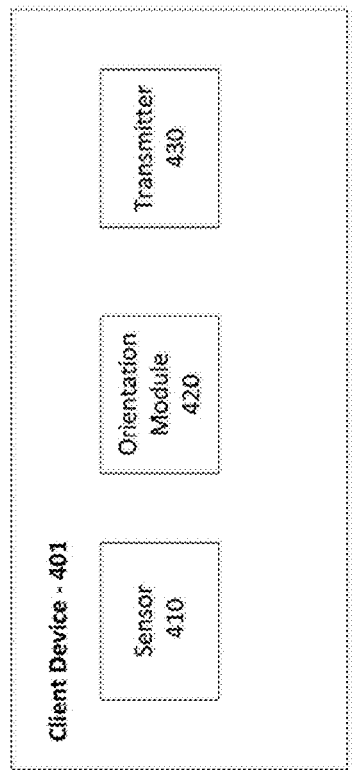
FIG. 4 is a client device according to an example of the present disclosure.

Referring to FIG. 4, client device 401 is illustrated in accordance with an example of the present disclosure. Client device 401 comprises a sensor 410 for sensing a visual code having an orientation from a computing device an orientation module 420 for determining an orientation of the client device based on the visual code; and a transmitter 430 for transmitting an indicia of client device orientation.

In various examples sensor 410 may receive data locally identifying a computing device, wherein the data is displayed via the computing device. The sensor may include a camera, video sensor, light sensor, proximity sensor, accelerometer, gyroscope, compass, microphone, and other sensors. The receipt of the data may be in response to a trigger from a user of the client device.

The orientation module 420 may be embodied within instructions stored on a non-transitory computer-readable medium, which may be executed by a processor, or alternatively, may be embodied in an integrated circuit, for example an application specific integrated circuit (ASIC). The orientation module 420 is to determine an orientation of the client device relative to a computing device displaying the data based on an orientation of the data. The orientation module 420 may also output an orientation signal to be transmitted to the computing device.

The transmitter 430 is to transmit the orientation signal, or alternatively, an indicia of orientation to the computing device. The transmitter may be independent or combined with a receiver. The transmitter 430 may be one of multiple transmitters within a client device 430, such as a local area network transmitter, a broadband transmitter, or a NFC device. Other transmitters are contemplated.

Figure 5:
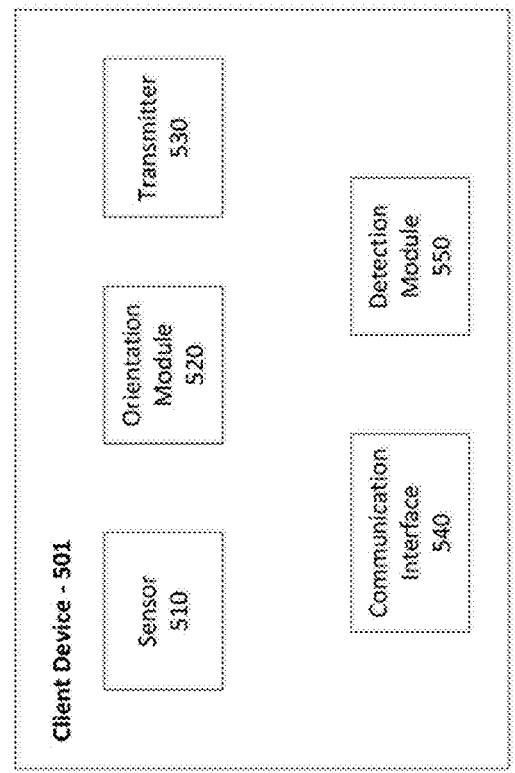
FIG. 5 is a client device according to an example of the present disclosure.

Referring to FIG. 5, another example of a client device 501 comprises a sensor 510, an orientation module 520, a transmitter 530, a communication interface 540, and a detection module 550. The orientation module 520 of client device 501 is configured to determine an orientation of the client device based on a visual code received and is further configured to determine an orientation of the client device based on a change in the orientation of the client device. Detection module 550 is configured to detect movement of the client device and output a signal, denoting a change in orientation or placement of the client device, to the orientation module in order to determine a change in orientation of the client device. The detection module 550 may be configured to continually detect movement.

The detection module 550 may include sensors similar to and included in the orientation module. The detection module 550 may be configured to movement of the client device. The movement may be determined via a camera and image differentiation hardware and software, gyroscopes noting movement in various directions or for prolonged periods of time, or a light sensor determining a different angle of incident light, in various examples. The detection module 550 may be configured to continually update the computing device on the location of the client device. In various examples, the detection module may be configured to send updates at predetermined instances, in response to various events, or based upon a determination of movement. Other examples are contemplated.

In one example, a user of smart phone (e.g. a client device) may wish to join a virtual card game being played on a shared computer (e.g computing device). The smart phone may serve as a client device requesting that a visual code be generated by a computing device 602 in order to determine an orientation of a client device 501 for use in a virtual game or other application. For example, a smart phone may serve as a requesting client device seeking to join a virtual card game being played on a shared computing device. Smart phone 501 may be one of several client devices seeking to join the virtual game.

Communication interface 540 of client device is enabled to handle communication requests or pairing requests from a client device which may be initiated or established in either direction to/from either of the client device 501 or computing device 602. Establishing the communication pairing enables the client device and the computing device to communicate over a communication channel, such as a network connection including network connections to the Internet. In an embodiment of the present disclosure, communication interface 540 may receive a request regarding communication pairing. The request may be initiated on the computing device 602. For example, based on a request from a client device, the computing device exchanges a visual code to establish communication pairing with client device. Devices may attempt various different pairing combinations, trading off displaying or receiving the visual code between the clients and computing device.

Figure 6:
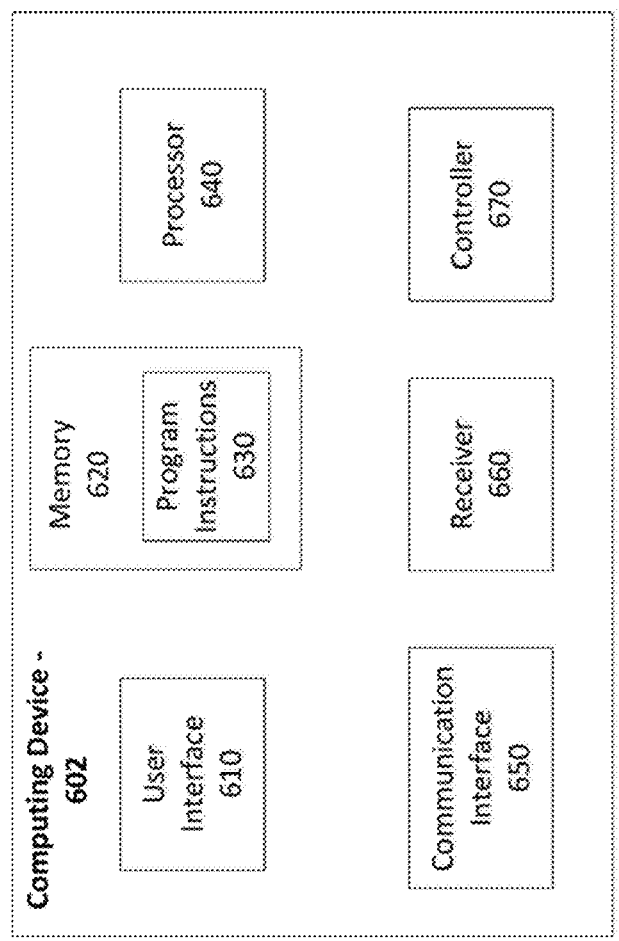
FIG. 6 is a computing device according to an example of the present disclosure.

Referring to FIG. 6, an embodiment of a computing device 602 is illustrated in accordance with the present disclosure. Computing device 602 may include a plurality of components for executing the client device orientation system. Computing device 602 includes memory 620 having program instructions 630, user interface 610, processor 640, communication interface 650, receiver 660, and controller 670 that will be described in more detail. The memory 620 includes a non-transitory computer readable medium comprising program instructions 630 that when executed cause a processor 640 to perform various functions. The functions may include generating a visual code locally identifying the computing device; displaying, on the user interface 610 of the computing device, the visual code having an orientation, where the visual code can be sensed by a client device and used by the client device to determine an orientation of the client device relative to the computing device; to arrange a user interface 610 of the computing device 602 based on the receipt, via a receiver 660 of a computing device, of an indicia of orientation of the client device relative to the computing device.

In various examples, generating data includes generating a visual code such as a quick response (QR) code, barcode, aura, watermark, or other image to be displayed on the user interface 610 of the computing device 602. The program instructions 630 may enable dynamic generation of data encoded with a key for identifying the computing device and utilizing a communications interface 650. Arranging the user interface 610 of the computing device, in various examples, may comprise rotating the user interface of the computing device or arranging an avatar, icon, or list item on the computing device screen to represent the orientation of the client device relative to the computing device. In addition, receiving an indicia of orientation via a receiver 660 may comprise receiving, an indicia of orientation in response to a detected movement of a client device, and the instructions for arranging the user interface further comprises instructions for rotating the user interface in response to the detected movement. In this manner a user interface may be continually updated with a location or orientation of the client device.

Communication interface 650 of computing device, similar to communication interface 540 of client device, is enabled to handle communication requests or pairing requests from a client device which may be initiated or established in either direction to/from either of the client device 501 or computing device 602. Establishing the communication pairing enables the client device and the computing device to communicate over a communication channel, such as a network connection including network connections to the Internet. In an embodiment of the present disclosure, communication interface 540 or 650 may receive a request regarding communication pairing. The request may be initiated on the client device 501 and/or the computing device 602. For example, based on a request from a client device, the computing device exchanges a visual code to establish communication pairing with client device. Devices may attempt various different pairing combinations, trading off displaying or receiving the visual code between the clients and computing device.

Receiver 660 of computing device 660 receives an input signal indicating, a determined orientation of a client device relative to a computing device. The receiver 660 outputs an orientation signal to a controller 670. Controller 670 is coupled to receiver 660 and is configured to arrange the user interface of the computing device based on the orientation signal. Controller 670 may be configured to control the appearance, layout, arrangement of a user interface and user interface elements displayed. Further, the user interface 610 is configured to display the user interface elements corresponding the relative placement or orientation of a client devices with respect to a computing device.

The foregoing disclosure has been presented for purposes of illustration and description. Although certain embodiments have been illustrated and described herein, the disclosure is not intended to be exhaustive or to limit the invention to the precise forms disclosed. It will be appreciated by those of ordinary skill in the art that a wide variety of alternate and/or equivalent embodiments or implementations to achieve the same purposes may be substituted for the embodiments shown and described without departing from the scope of this disclosure. The scope of the invention is to be defined by the claims appended hereto, and by their equivalents.

What is claimed is:

1. A method comprising:
   receiving, via a sensor of a client device, data identifying a computing device to the client device, wherein the data is displayed on a user interface of the computing device;
   determining, by the client device, an orientation of the client device relative to the computing device based on an orientation of the received data; and
   transmitting, by the client device to the computing device, an indicia of the orientation of the client device relative to the computing device to enable the computing device to rotate the user interface.

2. The method of claim 1, wherein the sensor includes a camera, and wherein receiving the data comprises capturing, using the camera, a quick response (QR) code, barcode, aura, watermark, or other image displayed on the user interface of the computing device.

3. The method of claim 1, wherein receiving the data comprises receiving dynamically generated data encoded with a key to identify the computing device.

4. The method of claim 1, wherein receiving the data comprises receiving data that enables communication over a network.

5. The method of claim 1, further comprising:
   decoding the data received from the computing device to identify the computing device and establish a communication link between the client device and the computing device.

6. The method of claim 1, wherein determining the orientation of the client device utilizing the received data comprises determining an orientation of a quick response (QR) code or a barcode displayed on the user interface of the computing device.

7. The method of claim 6, wherein transmitting the indicia of the orientation of the client device comprises transmitting an indicia to rotate the user interface.

8. The method of claim 1, wherein the transmitted indicia of orientation enables the computing device to position a user interface element representing a player of a game session utilizing the client device on a screen of the computing device.

9. The method of claim 1, further comprising:
   continually tracking, by the client device, a position of the client device relative to the computing device; and
   transmitting, by the client device to the computing device, the position to the computing device to enable the computing device to continually reorient the user interface.

10. A non-transitory computer readable medium comprising instructions that when executed cause a computing device to:
    dynamically generate data identifying the computing device;
    display, by a user interface of the computing device, the data in accordance with an orientation, wherein the data displayed in accordance with the orientation enables a client device to identify the computing device and to determine an orientation of the client device relative to the computing device;
    receive, from the client device, an indicia of the orientation of the client device relative to the computing device, the indicia responsive to capture, by a sensor of the client device, of the data displayed by the user interface of the computing device; and
    rotate the user interface of the computing device based on the received indicia of the orientation of the client device.

11. The computer readable medium of claim 10, wherein dynamically generating the data comprises dynamically generating a quick response (QR) code, barcode, aura, watermark, or other image displayed on the user interface of the computing device.

12. The computer readable medium of claim 10, wherein dynamically generating the data comprises dynamically generating data encoded with a key to identify the computing device for communication over a network.

13. The computer readable medium according to claim 10, wherein rotating the user interface comprises continually rotating the user interface in response to continual receipt of indicia of orientations of the client device due to movement of the client device.

14. The computer readable medium of claim 10, wherein dynamically generating the data comprises dynamically generating a quick response (QR) code or a barcode displayed on the user interface of the computing device.

15. A client device comprising:
- a sensor to receive data identifying a computing device, wherein the data is displayed on a user interface of the computing device;
- a processor;
- a non-transitory storage medium storing instructions executable by the processor to determine an orientation of the client device relative to the computing device based on an orientation of the received data, and to output an orientation signal to be transmitted to the computing device, the orientation signal representing the orientation of the client device relative to the computing device; and
- a transmitter to send the orientation signal to the computing device to cause the computing device to rotate the user interface of the computing device.

16. The client device of claim 15, wherein the instructions are executable by the processor to determine a change in orientation of the client device.

17. The client device of claim 15, wherein the sensor includes a camera, and the received data comprises a quick response (QR) code, barcode, aura, watermark, or other image displayed on the user interface of the computing device and captured by the camera.

18. The client device of claim 15, further comprising a communication interface for establishing a communication link with the computing device based on the received data identifying the computing device.

19. The client device of claim 15, further comprising detection instructions executable by the processor to detect movement of the client device to update the computing device of a change in orientation or position of the client device.

20. The client device of claim 15, wherein the received data comprises a quick response (QR) code or a barcode displayed on the user interface of the computing device.

* * * * *